(12) United States Patent
Saxer et al.

(10) Patent No.: US 11,650,042 B2
(45) Date of Patent: May 16, 2023

(54) COMMON LENS TRANSMITTER FOR MOTION COMPENSATED ILLUMINATION

(71) Applicant: BAE SYSTEMS INFORMATION AND ELECTRONIC SYSTEMS INTEGRATION INC., Nashua, NH (US)

(72) Inventors: Christopher E. Saxer, Cary, NC (US); Mark S. Branham, Oro Valley, AZ (US); Jacob D. Garan, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 96 days.

(21) Appl. No.: 16/414,971

(22) Filed: May 17, 2019

(65) Prior Publication Data
US 2020/0363185 A1    Nov. 19, 2020

(51) Int. Cl.
*G01B 9/02*       (2022.01)
*G01B 11/16*      (2006.01)
*G02B 27/10*      (2006.01)
*G02B 27/12*      (2006.01)
*G02B 27/48*      (2006.01)
*G01B 9/02098*    (2022.01)
*G02B 27/09*      (2006.01)
*G01S 7/481*      (2006.01)

(52) U.S. Cl.
CPC ..... *G01B 9/02098* (2013.01); *G01B 9/02087* (2013.01); *G01B 9/02095* (2013.01); *G01B 11/162* (2013.01); *G01S 7/4815* (2013.01); *G02B 27/0955* (2013.01); *G02B 27/106* (2013.01); *G02B 27/123* (2013.01); *G02B 27/48* (2013.01)

(58) Field of Classification Search
CPC .............. G01B 11/162; G01B 9/02098; G01B 9/02087; G01B 9/02095; G01S 7/4815; G01S 17/89; G01S 17/93; G01S 7/497; G02B 27/0955; G02B 27/106; G02B 27/123; G02B 27/48
See application file for complete search history.

(56) References Cited

U.S. PATENT DOCUMENTS

| 1,699,226 A | * | 1/1929 | Cox | ...................... G02B 27/123 |
| | | | | 359/639 |
| 5,467,122 A | * | 11/1995 | Bowker | .................. G01S 17/89 |
| | | | | 348/144 |
| 6,157,756 A | * | 12/2000 | Ishiwata | .............. G02B 6/2848 |
| | | | | 385/115 |

(Continued)

*Primary Examiner* — Violeta A Prieto
(74) *Attorney, Agent, or Firm* — Gary McFaline; Scott J. Asmus

(57) ABSTRACT

A laser transmission apparatus utilizing multiple laser beams and beam paths with a diverger lens to provide an illumination pattern that can compensate for lateral movement of the platform during shearography is provided. Further, this optical setup requires no moving parts and does not reduce power of the laser beams as they move through the individual components thereof. From the perspective of the surface being scanned or inspected, the present disclosure may provide two laser images of a single surface that appear to be identical despite the fact that they were taken from two different spatial positions of the moving platform.

20 Claims, 4 Drawing Sheets

(56) References Cited

U.S. PATENT DOCUMENTS

| | | | | |
|---|---|---|---|---|
| 6,411,371 | B1* | 6/2002 | Hinderling | G01S 7/4812 |
| | | | | 356/5.1 |
| 6,873,716 | B1* | 3/2005 | Bowker | G01S 17/42 |
| | | | | 382/128 |
| 8,717,577 | B1 | 5/2014 | Kokobun et al. | |
| 8,804,132 | B1 | 8/2014 | Saxer | |
| 9,476,700 | B2 | 10/2016 | DeWeert et al. | |
| 9,818,181 | B1 | 11/2017 | Acker et al. | |
| 10,425,598 | B2* | 9/2019 | Lin | G01J 3/2823 |
| 10,466,038 | B1 | 11/2019 | Kokubun et al. | |
| 10,473,767 | B2* | 11/2019 | Xiang | G02B 26/105 |
| 10,620,051 | B2 | 4/2020 | Acker et al. | |
| 10,816,647 | B2* | 10/2020 | Xiang | G02B 27/106 |
| 11,391,959 | B2* | 7/2022 | Kokubun | G02B 27/126 |
| 2016/0166431 | A1* | 6/2016 | Vogler | A61F 9/00825 |
| | | | | 606/5 |
| 2017/0203384 | A1* | 7/2017 | Zhao | B23K 26/0006 |
| 2017/0205034 | A1* | 7/2017 | Lau | G09F 13/00 |
| 2017/0366763 | A1* | 12/2017 | Lin | H04N 5/332 |
| 2018/0066810 | A1* | 3/2018 | Lentine | G02B 19/0052 |
| 2018/0164089 | A1* | 6/2018 | Schönleber | G01B 9/02091 |
| 2018/0196139 | A1* | 7/2018 | Brown | G01S 17/10 |
| 2018/0364334 | A1* | 12/2018 | Xiang | G01S 17/42 |
| 2019/0129277 | A1* | 5/2019 | Zawischa | G02F 1/3544 |
| 2020/0018829 | A1* | 1/2020 | Xiang | G02B 26/105 |
| 2021/0011136 | A1* | 1/2021 | Xiang | G01S 17/931 |
| 2021/0055567 | A1* | 2/2021 | Kokubun | G02B 27/108 |
| 2021/0255284 | A1* | 8/2021 | Li | G01S 7/4813 |
| 2022/0011091 | A1* | 1/2022 | Acker | G01B 9/02098 |
| 2022/0050187 | A1* | 2/2022 | Yao | G01S 7/484 |
| 2022/0342227 | A1* | 10/2022 | Kokubun | G02B 27/48 |

* cited by examiner

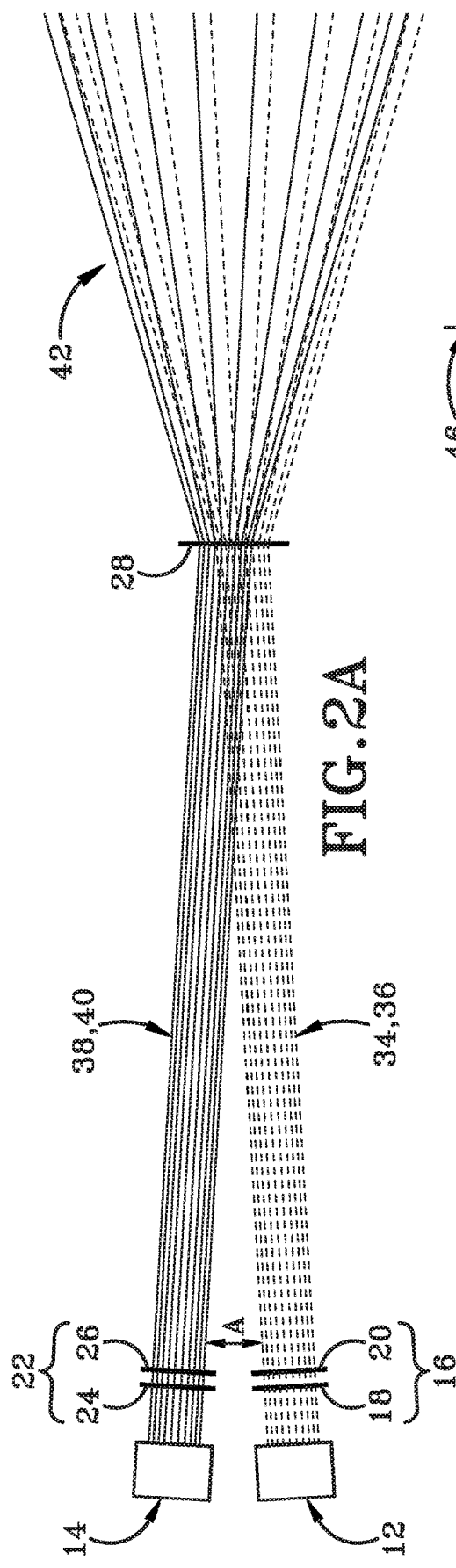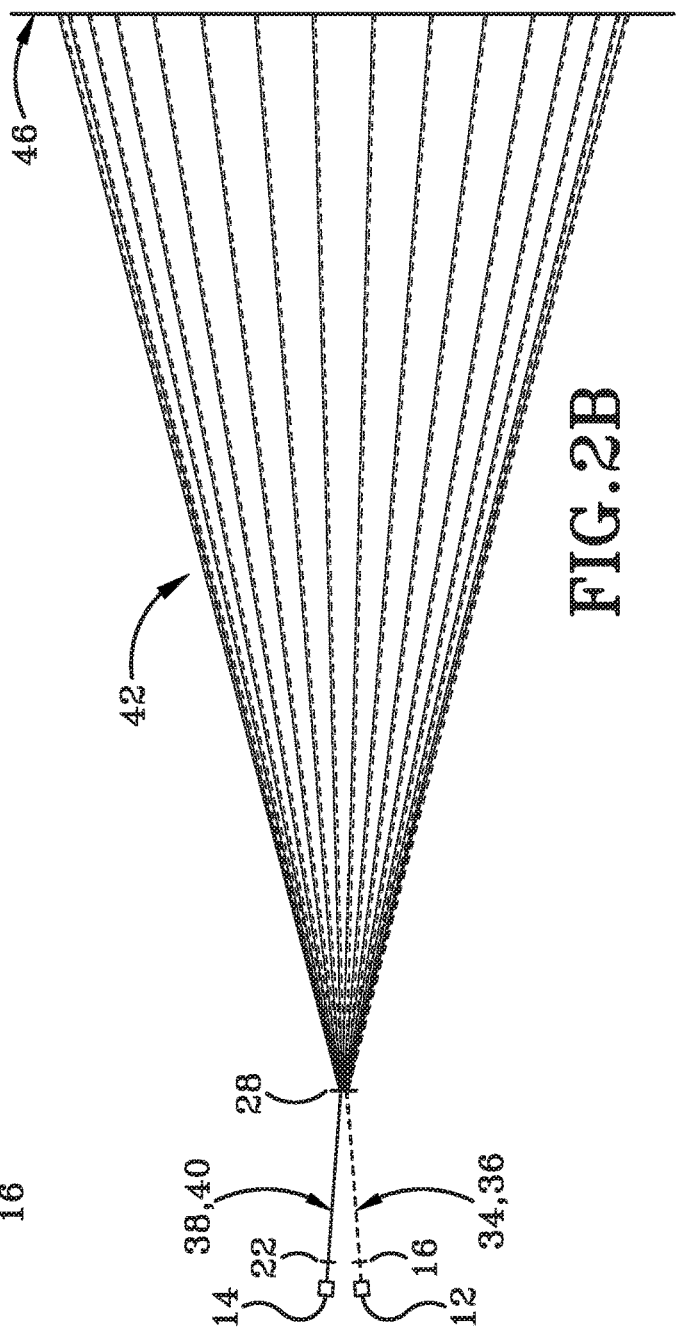

COMMON LENS TRANSMITTER FOR MOTION COMPENSATED ILLUMINATION

STATEMENT OF GOVERNMENT INTEREST

This invention was made with government support under Prime Contract No. N00014-16-C-3059 awarded by the U.S. Navy. The government has certain rights in the invention.

TECHNICAL FIELD

The present disclosure relates generally to the field of shearography. More particularly, in one example, the present disclosure relates to a laser transmitter for use in shearography utilizing more than one laser beam. Specifically, in another example, the present disclosure relates to a laser transmitter utilizing more than one laser beam directed through a common optical diverger to compensate for motion of a platform during shearography.

BACKGROUND

Shearography, or as it is sometimes known, speckle pattern shearing interferometry, is a non-destructive method of testing and measuring strain and/or vibration of different materials. Specifically, shearography utilizes coherent light to produce an interference pattern known as a speckle. The speckle may then be compared to a known reference image, which is typically a first image of the same surface. Accordingly, shearography requires multiple measurement of the same surface to produce the comparative speckles.

When shearography is performed using coherent light, it is typically performed by first generating a coherent laser beam which is then reflected off of a target surface to produce a base line reference. A strain or stress is then commonly applied to the surface in the form of a small load to deform the materials slightly. Examples of strain or stress that may be applied may be a physical load, a vacuum, an acoustic vibration, or the like. A second projection of the laser beam (or a second similar laser beam) is then reflected off of the same surface to produce a second reference which may then be compared to the first to identify flaws in the surface.

Shearography is particularly useful in determining very minuscule flaws or distortions in what appears to be an otherwise uniform surface and provides a fast and accurate indication about discontinuities or anomalies in an otherwise non-homogeneous material. Shearography is therefore very useful in industries, such as aerospace, space, marine, wind power, automotive, and tires, as well as in military applications and fine art conservation, as a shearing interferometer is able to detect extremely small (submicrometer) changes in a surface and out of plane deformation. Shearography may further allow for detection of foreign materials or structures hidden within or beneath a layer of material or substrate.

As shearography uses two images of the same surface to create each shearogram, any movement of the laser generator or the receiver can reduce the speckle field correlation between measurements and thereby invalidate or otherwise corrupt the test. Thus, when performing shearography from a moving platform, such as a vehicle or an aircraft, the motion of the platform must be account for and effectively eliminated from the final images.

Current solutions for performing shearography from a moving platform include optical components with switching times to compensate for the motions of these components, such as mirrors, lens, and the like, need to be moved quickly as the lasers are generated to produce specklegram images for use in shearography. Moving these components and the speed at which they need to be moved result in complex and expensive systems which require regular and highly technical maintenance. Further, many of the current solutions involving mechanical components, partially reflective beamsplitters, and/or other physical devices tend to reduce the output power of the laser beams, requiring higher power (i.e. larger and more expensive) beams to be used. For other solutions, such as polarization switching optics, that have comparably high transmission, there is still an added need of timing control.

Other current solutions may involve utilizing complex mathematical algorithms and/or processing software along with additional motion compensation devices, such as those discussed above. These processes may allow for additional error to be introduced during the processing steps through introduction of variables and corruption in the data collection and/or transfer.

SUMMARY

The present disclosure addresses these and other issues by providing a laser transmission apparatus utilizing multiple laser beams and beam paths with a diverger lens to provide an illumination pattern that can compensate for lateral movement of the platform during shearography. Further, this optical setup requires no moving parts and does not reduce power of the laser beams as they move through the individual components thereof. From the perspective of the surface being scanned or inspected, the present disclosure may provide two laser images of a single surface that appear to be identical despite the fact that they were taken from two different spatial positions of the moving platform.

In one aspect, an exemplary embodiment of the present disclosure may provide an optical transmitter for shearography comprising: a first beam generator operable to produce a first laser beam along a first beam path; a second beam generator operable to produce a second laser beam along a second beam path; and a diverger lens within both of the first and second beam paths, wherein the first beam and the second beam through the diverger lens are used to make a shearography measurement. This exemplary embodiment or another exemplary embodiment may further provide wherein the diverger lens is spherical and is positioned at the intersection of the first and second beam paths. This exemplary embodiment or another exemplary embodiment may further provide a first shaping optic within the first beam path; and a second shaping optic within the second beam path. This exemplary embodiment or another exemplary embodiment may further provide wherein the first shaping optic further comprises: a first lens pair within the first beam path between the first beam generator and the diverger lens, wherein the first lens pair is operable to independently determine the X and Y divergence of the first beam. This exemplary embodiment or another exemplary embodiment may further provide wherein the second shaping optic further comprises: a second lens pair within the second beam path between the second beam generator and the diverger lens, wherein the second lens pair is operable to independently determine the X and Y divergence of the second beam. This exemplary embodiment or another exemplary embodiment may further provide wherein each of the first beam path and the second beam path are oriented at an angle relative to the other of the first beam path and the second beam path. This exemplary embodiment or another exemplary embodiment may further provide wherein the optical transmitter is carried by a moving platform. This exemplary embodiment or another exemplary embodiment may further provide wherein the moving platform further comprises: one of a rotary-winged aircraft, fixed wing aircraft, drone, and lighter than air aircraft. This exemplary embodiment or another exemplary embodiment may further provide wherein the first beam generator and second beam generator are the same beam generator that is operable to generate a single beam and further comprises: a plurality of optical components operable to direct the single beam down a first beam path and a second beam path separate from the first beam path. This exemplary embodiment or another exemplary embodiment may further provide wherein the plurality of optical components further comprise: at least one high speed switching optic to change the direction of the single beam from the first path to the second path. This exemplary embodiment or another exemplary embodiment may further provide wherein the plurality of optical components further comprise: a beam splitter operable to split the single beam into the first path and the second path.

In another aspect, an exemplary embodiment of the present disclosure may provide a method of performing shearography comprising: generating a first laser beam from a first beam generator carried by a platform; directing the first laser beam through a diverger lens towards a target surface; moving the platform from a first position to a second position; generating a second laser beam from a second beam generator carried by the platform; and directing the second laser beam through the diverger lens towards the target surface. This exemplary embodiment or another exemplary embodiment may further provide comprising: applying a stressor to the target surface after directing the first laser beam through the diverger and prior to generating the second laser beam. This exemplary embodiment or another exemplary embodiment may further provide wherein applying the stressor to the target surface further comprises: applying one of a mechanical stressor and an acoustic stressor to the target surface. This exemplary embodiment or another exemplary embodiment may further provide receiving each of the first and second laser beams as they reflect off of the target surface. This exemplary embodiment or another exemplary embodiment may further provide wherein receiving each of the first and second laser beams further comprises: receiving the first laser beam reflection prior to applying the stressor; and receiving the second laser beam reflection after applying the stressor. This exemplary embodiment or another exemplary embodiment may further provide creating a first interference pattern from the received first laser beam reflection and second interference pattern from the received second laser beam reflection via a processor. This exemplary embodiment or another exemplary embodiment may further provide comparing the first interference pattern to the second interference pattern to determine if a change to the target surface has occurred. This exemplary embodiment or another exemplary embodiment may further provide communicating a result of the comparison between the first and second interference patterns to an operator of the platform. This exemplary embodiment or another exemplary embodiment may further provide wherein communicating the result of the comparison further comprises: communicating the result of the comparison between the first and second interference patterns to an operator of the platform only if a change is detected in the target surface.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2A (FIG. 2A) is an overhead plan view of an optical laser transmitter showing the beam paths and orientation thereof according to one aspect of the present disclosure.

FIG. 2B (FIG. 2B) is a zoomed-out overhead plan view of the optical laser transmitter from FIG. 2A showing the divergence of the beams after the diverger lens according to one aspect of the present disclosure.

DETAILED DESCRIPTION

Figure 1:
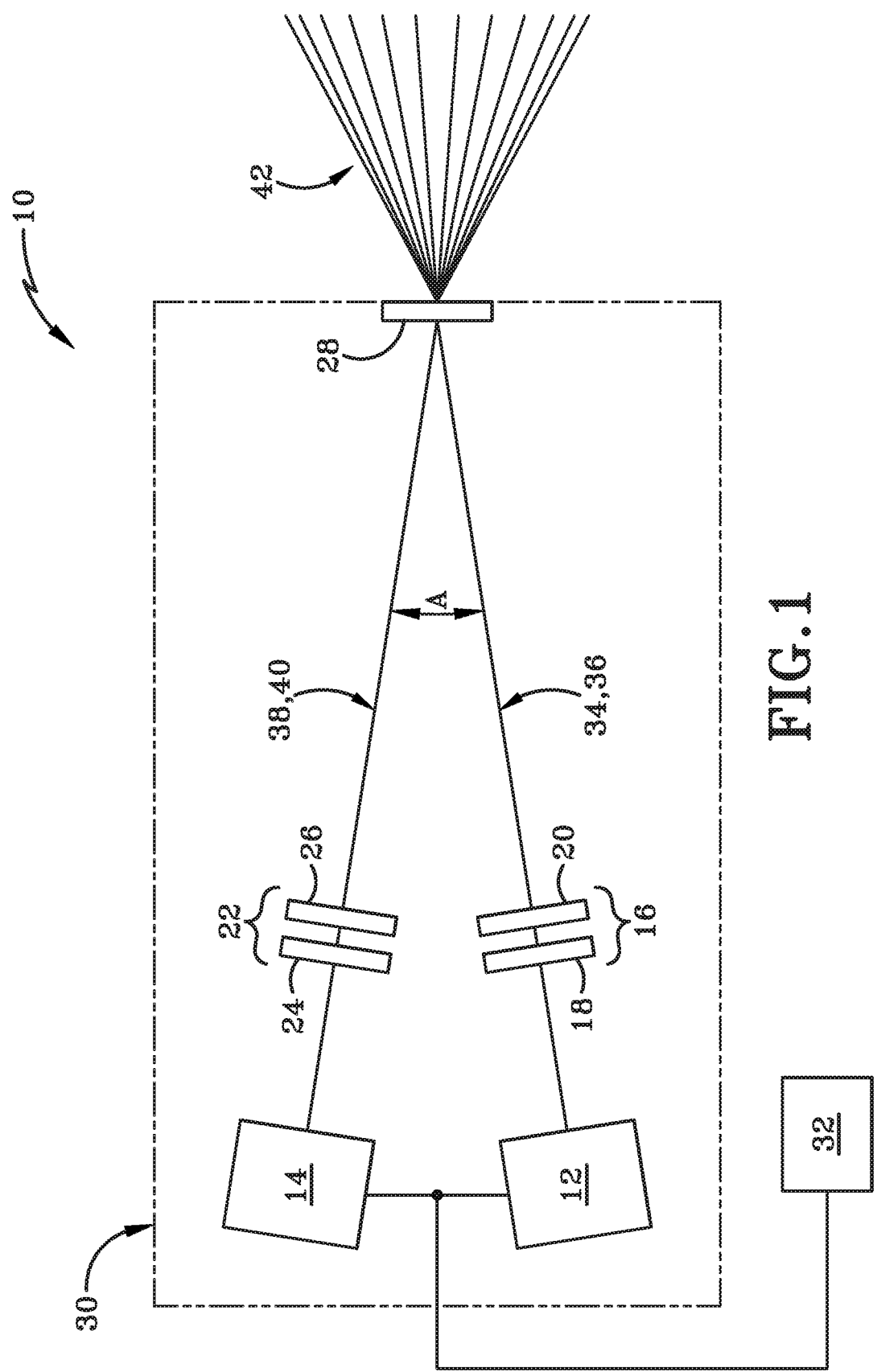
FIG. 1 (FIG. 1) is an overhead schematic view of an optical laser transmitter according to one aspect of the present disclosure.

With reference to FIG. 1, an optical laser transmitter is shown and generally indicated at reference 10 and may be generally referred to herein as optical transmitter or transmitter 10. Transmitter 10 may include a first beam generator 12, a second beam generator 14, a first shaping optic 16 which may include a first lens 18 and a second lens 20, a second shaping optic 22 which may include a third lens 24 and a fourth lens 26, and a diverger lens 28. Transmitter 10 may further include or be enclosed within a housing 30 and may further be connected to or in communication with a processing unit or processor 32.

First beam generator 12 may be a laser beam generator operable to produce a monochromatic and/or coherent laser light that can be used to measure surface displacements in the submicrometer range as discussed further herein. First beam generator 12 may generate a first beam 34 which may follow a first beam path 36 through transmitter 10 as discussed further herein. According to one aspect, first beam generator 12 may include one or more optics contained therein to effect the first beam path 36 or the size of first beam 34. For example, first beam generator 12 may include one or more mirrors, collimators, divergers, or the like to generate the desired first beam 34.

Similar to first beam generator 12, second beam generator 14 may be a laser beam generator operable to generate second beam 38 which may also be a monochromatic and/or coherent laser for use in measuring surface displacement in a submicrometer range. Second beam generator 14 may generate second beam 38 down second beam path 40 through optical transmitter 10, as discussed further herein.

According to one aspect, first beam generator 12 and second beam generator 14 may each generate a separate laser, i.e., first beam 34 and second beam 38, respectively. According to another aspect, first and second beam generators 12, 14 may be beam director assemblies which may accept a laser beam from a remote source and direct that beam down first and second beam paths 36, 38, respectively. Further, according to this aspect where first and second beam generators 12, 14 are beam director assemblies, each of first and second beam generator 12, 14 may include the appropriate optical components to direct the accepted beam down the desired beam paths 36, 40. According to another aspect, first beam 34 and second beam 38 may be two parts of the same beam which may be generated remotely from transmitter 10 and carried through first and second beam generator 12, 14, respectively. According to this aspect, first beam 34 may be a first pulse traveling through first beam generator 12 while second beam 38 may be a second pulse of the same laser that takes an alternate path through second beam generator 14. According to another aspect, first and second beams 34, 38 may be the same beam and first and second beam generators 12, 14 may serve as one or more beam splitters to produce the first and second beams 34, 38 traveling down first and second beam paths 36, 40 as discussed further herein. According to another aspect, where first and second beams 34, 38 are the same beam, beam generators 12, 14 may include at least one high speed switching optic operable to change the direction of the beam to travel down either of the first or second beam paths 36, 40.

First and second beam 34, 38 may have a relative angle, indicated as angle A in FIG. 1, that may be determined by the lateral offset between the beam generators 12, 14. According to another aspect, angle A may be determined by the relative position of the beam paths 36, 40 as first beam 34 and second beam 38, particularly in embodiments where first and second beams 34 and 38 may be generated from a single beam generator, or may be split from a single beam, as discussed further herein. The lateral offset of beam generators 12, 14 and/or beam paths 36, 40 may be determined according to the motion of platform 44, i.e. the speed and direction of travel of platform 44, as discussed further herein. According to another aspect, the power of diverger lens 28 may determine or otherwise contribute to relative angle A.

First shaping optic 16 may be a first lens pair having a first and second lens 18, 20 which may be a series of low power shaping optics which may determine X and Y divergence independently of each other. According to one aspect, first lens 18 may determine X divergence of first beam 34 while second lens 20 may determine the Y divergence of first beam 34. According to another aspect, these roles may be reversed with first lens 18 determining Y divergence and second lens 20 determining X divergence of first beam 34. First and second lens 18, 20 of first shaping optic 16 may be any suitable shaping optic including low power cylindrical shaping optics to provide the desired shape of beam spread 42. This shape or illumination pattern of beam spread 42 may be easily adjusted by changing the powers of first and second lens 18, 20 of first shaping optic 16.

Similarly, second shaping optic 22 may be a second lens pair including third and fourth lens 24, 26 that may be similar or identical to first shaping optic 16 in that third and fourth lens 24, 26 may be any suitable shaping optics and may determine the X and Y divergence of second beam 38 independently of one another with third lens 24 determining one of the X or Y divergence and fourth lens 26 determining the other of the X and Y divergence of second beam 38. As with first shaping optic 16, second shaping optic 22 may be any suitable low power shaping optic, including cylindrical shaping optics, to produce the desired illumination pattern or shape of beam spread 42 as discussed further herein.

Although discussed herein as lens pairs, i.e. first and second lens 18, 20 and third and fourth lens 24, 26, it will be understood that first and second shaping optics 16, 22 may each be a single optical element, or may be omitted from one or both beam paths 36 and/or 40. For example, first shaping optic 16 may be any suitable optics for producing a desired first beam 34 shape as dictated by the desired implementation while second shaping optic 22 may be the same type of optical component, a different optical component, or may be omitted entirely. Similarly, second shaping optic 22 may be any type of optical component while first shaping optic 16 may be a different optical component, or may be omitted entirely.

Diverger lens 28 may be a single primary diverger lens in that it may be primarily responsible for the overall majority of divergence of first and second beam 34, 38 to produce the beam spread 42 as discussed further herein. According to one aspect, diverger lens 28 or diverger 28 may be a spherical optical component operable to produce the beam spread 42 from first beam 34 and/or second beam 38 as discussed further herein.

First lens 18, second lens 20, third lens 24, fourth lens 26, and/or diverger lens 28 may be custom lenses able to accommodate, resize, and/or redirect first beam 34 and/or second beam 38 as desired. These lens 18, 20, 24, 26, and/or 28 may be standard optical lenses and may be formed of any suitable optical quality material, including glasses made from elements such as germanium, silicone, zinc selenide, fused silica, or any other suitable lens construction. Further, these lenses 18, 20, 24, 26, and/or 28 may be coated with materials to effect the operations thereof. For example, one or more of these lenses 18, 20, 24, 26, and/or 28 may include an anti-reflective coating thereon.

Lenses 18, 20, 24, 26, and/or 28 may be mounted in a stationary position within transmitter 10 or may be connected within transmitter 10 by moveable mounts, such as gimbal mounts or any other suitable mount as dictated by the desired implementation.

Housing 30 may be formed of any material suitable for both containing the transmitter 10 and the components thereof within housing 30 while maintaining the proper and desired qualities of light reflection or absorption. For example, housing 10 may be constructed of metal and may be coated, painted, or otherwise treated to suppress stray light reflections within housing 30. By way of one non-limiting example, housing 30 may be coated with black optical paint. Such coatings or treatments may prevent stray light coming from first and second beams 34, 38 from reflecting off of portions thereof. According to another aspect, housing 30 may be constructed of any other suitable material or may be omitted altogether where transmitter 10 may be installed and affixed directly to and/or within a platform 44. As first and second beam 34, 38 are contemplated to exit housing 30 through diverger lens 28, it is contemplated diverger lens 28 may be imbedded or otherwise affixed to one portion of housing 30 such that diverger lens 28 may define an opening in the housing 30 suitable for the passage of first and second beams 34, 38 there through.

Processor 32 may be a computer, a processor, a logic, a logic controller, a series of logics, or the like which may include or be in further communication with one or more non-transitory storage mediums and may be operable to both encode and carry out a set of encoded instructions contained therein. Processor 32 may control the optical transmitter 10, including first and set beam generators 12, 14, to dictate or otherwise oversee the operations thereof as discussed further herein. Processor 32 may be in further communication with other systems or processors, such as onboard navigational computers and the like, of a platform 44 to both send and/or receive information therefrom used in determining that operations of transmitter 10.

Transmitter 10, including first and second beam generators 12, 14, may be wired and in direct communication with processor 32 or that connection may be indirect or wireless therebetween. For example, processor 32 may be a computer carried by a platform 44 that is also carrying optical transmitter 10 and may include a direct wired connection between processor 32 and optical transmitter 10. According to another example, processor 32 may be an onboard computer carried by platform 44 and may be in wired communication with optical transmitter 10 through one or more intermediate systems, such as other onboard computing systems and the like. Alternatively, processor 32 may be in wireless communication using any known or suitable wireless transmission protocol to communicate between transmitter 10 and processor 32. According to another aspect, processor 32 may be remote from transmitter 10 and in wireless communication therewith again utilizing any suitable wireless transmission protocol.

Transmitter 10 may further be in communication with or otherwise include a receiver 48 which may be a standard optical receiver 48 of the type normally used for shearography, provided it is capable of receiving laser light from the first and second laser beams 38, 40 as they reflect back from a target surface 46. Receiver 48 may be in further communication with processor 32 and/or other platform systems, as necessary.

Having thus described the individual components and elements of transmitter 10, the operation and method of use will now be discussed.

With reference to FIGS. 2A, 2B, and 2C, first beam 34 and second beam 38 are shown in more detail as they move through transmitter 10. Specifically, with reference to FIG. 2A, first beam 34 (represented by dashed lines) may follow beam path 36 from first beam generator 12 through first X,Y lens pair 16 and to diverger lens 28, while second beam 38 (represented by solid lines) may follow second beam path 40 from second beam generator 14 through second X,Y lens pair 22 and to diverger lens 28. As first and second beams 34, 38 pass through diverger lens 28, the beams 34, 38 are diverged, or spread, into beam spread 42 to cover more area. As seen in FIG. 2A, individual ray paths of each of first and second beams 34, 36 (dashed and solid lines intermixed within beam spread 42) begin to spread as they exit diverger lens 28.

With reference to FIG. 2B, these beams 34, 38 continue to spread as they travel over distance until they encounter a surface, such as a target surface 46, being measured. By comparing FIGS. 2A and 2B, it is shown that the beam spread 42 increases for both first and second beam, 34, 38 as they travel over distance to the point that the beam spread 42 of each beam overlaps and the illuminated target area is imperceptible as to the exact point of origin for each of first and second beam 34, 38.

If viewed looking into diverger lens 28 backwards along beam paths 36, 40 from the perspective of the target surface 46, the beam spread 42 expands such that both first and second beams 34, 38 appear to originate from the same spatial point despite having been generated from two separate locations due to the movement of the platform 44, as discussed further herein.

The relative angle A between first beam 34 having first beam path 36 and second beam 38 having second beam path 40 may be determined based on the lateral distance traversed by the platform 44 between generating first beam generator 12 and second beam generator 14 to produce first and second beams 34, 38, respectively. The longer the time period between the generating of each first and second beam generator, the farther platform 44 will have traveled, thus resulting in a larger relative angle A between first and second beam paths 36, 40. As the physical distance between first and second beam generators 12, 14 and/or beam paths 36, 40 increases, the relative angle A will increase as well. Similarly, as a platform 44 moves during operation of transmitter 10, the larger distance traversed between generating first and second beam generators 12, 14 may cause an increase of the relative angle A between the first and second beams 34, 38 and their associated beam paths 36, 40. Further, if the physical distance between generators 12, 14 and/or beam paths 36, 40 decreases, or if the speed of platform 44 is slowed, the relative angle A will likewise decrease.

Angle A may also be affected by the placement of beam generators 12, 14 within housing 30, however, this angle will be known prior to operation of optical transmitter 10 and may be accounted for in the interpulse timing between generating first and second laser beams 34, 38. Additionally, the power of diverger lens 28 may also affect the relative angle A causing the angle to increase or decrease as the power of the lens changes. This power will also be known prior to operation of optical transmitter 10 and may be properly accounted for as well.

With now to FIG. 3, an operational example wherein platform 44 is a helicopter is shown and will be discussed. Although depicted herein as a helicopter, platform 44 may be a vehicle of any type that is capable of carrying optical transmitter 10 while operating the same for use in shearography. According to one aspect, as further discussed and depicted herein, platform 44 may be a helicopter or another type of aircraft, either manned or unmanned, including other fixed wing and/or rotary aircraft. According to another aspect, platform 44 may be a sea-based or land-based vehicle or may be a manned portable device, i.e., a device that may be carried by one or more persons while being operated.

Figure 3:
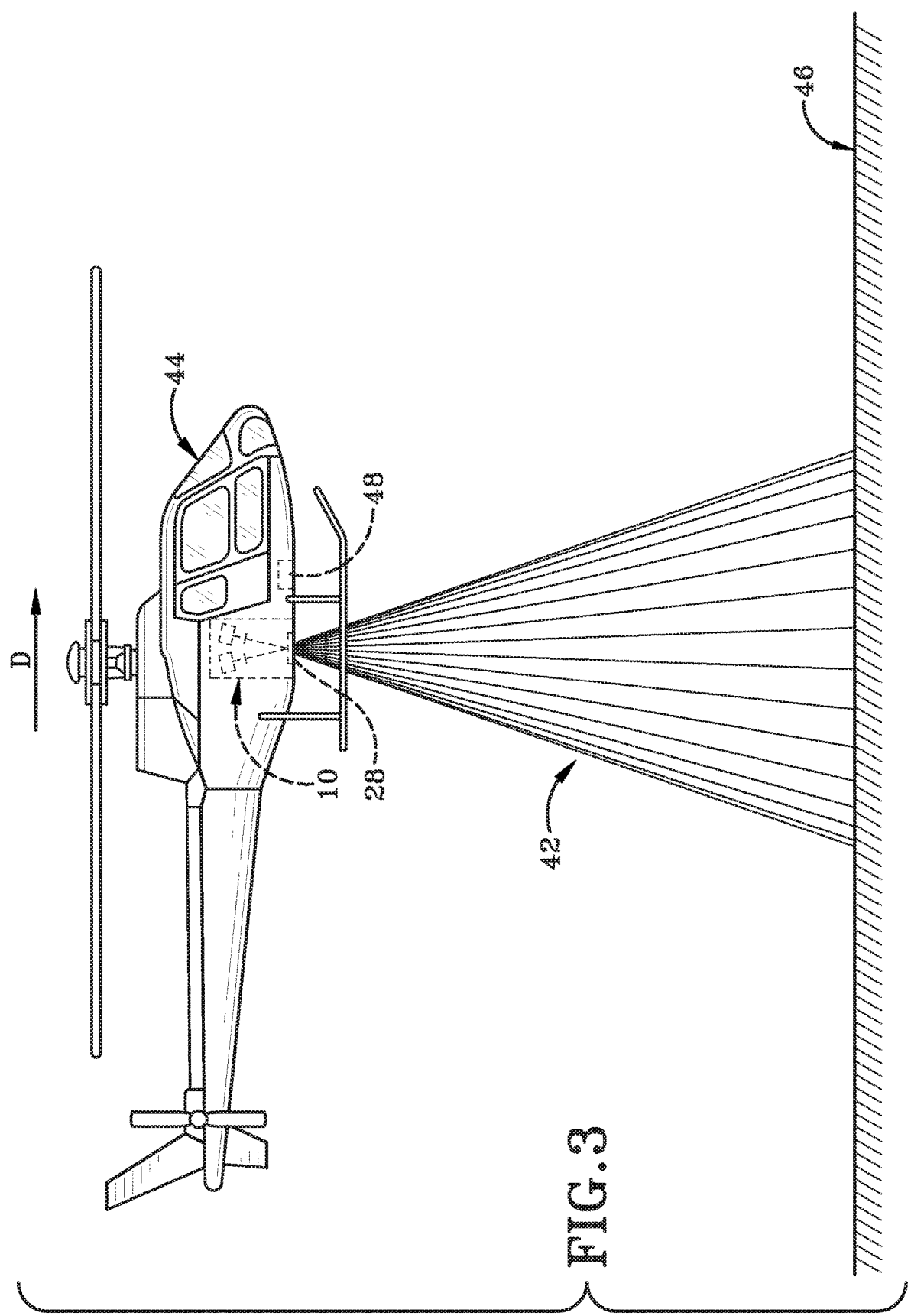
FIG. 3 (FIG. 3) is an operational view a helicopter performing shearography on a target surface according to one aspect of the present disclosure FIG. 4 (FIG. 4) is a flow chart representation of a method of performing shearography from a moving platform according to one aspect of the present disclosure Similar numbers refer to similar parts throughout the drawings.

As depicted in FIG. 3, platform 44 carrying optical transmitter 10 may move in a direction of travel D, indicated by the arrow at the top of FIG. 3, such that the platform 44 is moving in a lateral direction relative to the first and second beam generators 12, 14. As platform 44 travels over a target surface 46 and performs shearography, first and second beam generators 12, 14 may successively be generated to generate first beam 34 and second beam 38, respectively. The lateral movement of platform 44 in direction D may be accounted for in the relative angle A between first beam 34 and second beam 38.

Specifically and by way of example, platform 44, or as used herein in this example, helicopter 44 may fly over a target surface 46 and may perform shearography or take shearography images thereof. First platform 44 may activate the optical transmitter 10 and generate first beam generator 12 to generate first beam 34 which may then travel down first beam path 36 and out through diverger lens 28 towards target surface 46. As the first beam 34 passes through diverger lens 28, the first beam 34 is diverged into beam spread 42 to cover a larger surface area of target surface 46. First beam 34 may reflect off of target surface 46, where it is then detected by receiver 48. Once first beam 34 has reflected from target surface 46, a stressor or load may be applied to target surface 46 while simultaneously, or in rapid succession, triggering second beam generator 14 to generate second beam 38 down second beam path 40 and out of transmitter 10 through diverger lens 28 towards target surface 46. The stressor or load applied to target surface 46 may cause the material of target surface 48 to deform slightly which will be accounted for from the reflection of second beam 38 bouncing off the target surface 46 and returning to receiver 48. An interference pattern may be created from each beam as it is received by receiver 48. Processor 32 may then be compare and/or overlay the two interference patters with one another to identify non-uniform movement of the target surface 48 as a result of the stressor or load being applied.

Where platform 44 is not in physical contact with target surface 46 during performance of this shearography process, the stressor may be applied through remote means, such as through acoustic vibration or sonic waves directed at the target surface. According to one aspect, this may be a sonic vibration generated by platform 44 itself.

According to another aspect, a mechanical stressor may be applied via a separate structure, such as a ground vehicle or the like. For example, a second vehicle in physical contact with target surface 46 may follow platform 44 and apply stress or a load to target surface 46 as necessary. According to another aspect where platform 44 is not in physical contact, a projectile or other object may be delivered to target surface 46 to apply stress or a load thereto.

With known factors including the position of platform 44 when first and second beams 34, 38 are generated, the speed and heading of the platform 44, and the position of the first and second beam generators 12, 14 relative to the diverger lens 28, or more specifically, the relative angle A therebetween, can allow processor 32 to determine the proper interval between generating first beam generator 12 and second beam generator 14 to account for and/or effectively eliminate the effects of the motion of platform 44. Further, as first and second beams 34, 38 pass through the diverger lens 28, the beams may be diverged to substantially fill the field of view to further compensate for the motion of platform 44.

It is contemplated therefore that platform 44 will move at a predetermined and relatively constant velocity along direction of travel D which may allow first beam generator 12 and second beam generator 14 to be preset at a predetermined relative angle A or to deliver first beam 34 and second beam 38 along first beam path 36 and second beam path 40 at a predetermined relative angle A. This may further allow the components of optical transmitter 10 to be fixed, thus reducing any likelihood of introduced error through unintended movement of components of transmitter 10.

The process herein may account for the motion of platform 44 without expensive or complex optical designs and without any moving parts within transmitter 10. Further, as the diverger lens 28, the first shaping optic 16, and the second shaping optic 22 may be standard optical components, there are numerous off-the-shelf options for these lenses or lens elements 18, 20, 24, 26, and/or 28 that are readily available, inexpensive, and easily replaceable. Thus, any service or maintenance required by optical transmitter 10 may be performed quickly and inexpensively thus minimizing the downtime during which optical transmitter 10 and/or platform 44 are unavailable for operation.

Further, as the present design of optical transmitter 10 supports overlapping beams and multiple beam shots without compressing the diameter of the beam, the present design may significantly reduce transmission and does not require any polarization switching between the individual beam shots to maintain a desired output polarization state.

Aside from common and comparably negligible losses in transmission through media such as Fresnel reflections, absorption, and scattering, the setup of optical transmitter 10 does not reduce power of the laser beams as they move through the individual components thereof. Further, Fresnel reflections may be reduced by using anti-reflection coatings on lenses or lens elements 18, 20, 24, 26, and/or 28, and absorption and scattering may controlled by glass choices and lens manufacturing constraints. This approach can provide >99% for any number of laser beam shots while wasteful approaches theoretically max out at 100%/N shots, (e.g. 50% for two shots, etc.).

In other words, the simple optics utilized herein for optical transmitter 10 do not reduce the energy of first and second beams 34, 38 thus a lower powered and/or shorter beam pulse may be utilized to achieve the same or better results as prior solutions utilizing components that may reduce the energy of each beam 34, 38.

Figure 4:
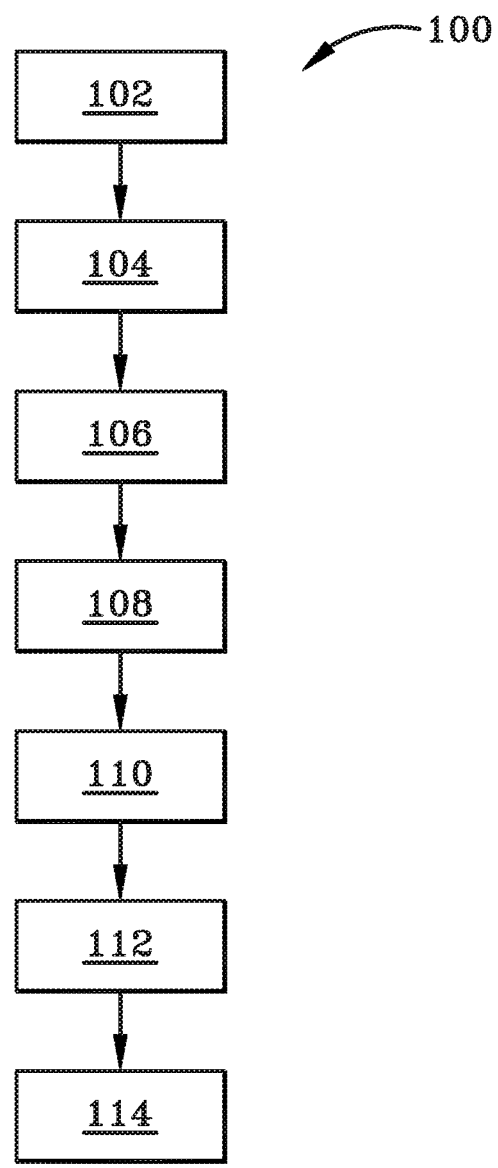

With reference to FIG. 4, the general method of use for optical transmitter 10 as discussed above is depicted therein in flow chart form. The method is indicated in FIG. 4 as process 100 and may begin with generating a first beam 34 from the first beam generator 12 through diverger lens 28 at a first position on a target surface 46. Generating the first beam 34 is indicated in FIG. 4 as reference 102 while diverging the first beam 34 through diverger lens 28 and towards the target surface 46 is indicated as step 104. Next, the platform 44 may move from a first position to a second position as step 106 and a stressor or load may be applied to the target surface in step 108. According to one aspect, the stressor may be applied prior to moving the platform 44 from a first position to a second position. According to another aspect, the stressor may be applied simultaneously or in rapid succession with moving the platform 44, provided the stressor is applied after generating the first laser beam and prior to generating the second laser beam 38. Accordingly, next, the second beam 38 may be generated from second beam generator 14 through the diverger lens 28 and at the target surface 46. The generating of second beam is indicated as reference 110 in FIG. 4. Then second beam 38 may be diverged by diverger lens 28 into the beam spread 42 and directed toward target surface 46. The divergence of second beam 38 is indicated as reference 112.

As discussed previously herein, additional steps may be included in process 100, namely, receiver 48 may receive a reflection from first beam 36 and from second beam 38. These steps are not included in the flow chart in FIG. 4 as the reception of the beams can occur at any point throughout the process 100 provided each of the respective beams 34, 38 have been generated. In other words, receiver 48 may receive the reflection of first beam 34 at any time after the first beam 38 has been generated, but not before. Similarly, receiver 48 may receive the reflection of second beam 38 at any time after second beam 38 has been generated, but not before. The limiting factor on when the reflected beams are received is determined by the distance between the target surface 46 and the receiver 48.

Finally, once both laser beams 34, 38 have been generated (steps 102 and 110, respectively), and the receiver 48 has detected the reflections therefrom, processor may produce a first interference pattern from the first beam 34 reflection and a second interference pattern from the second beam 38 reflection. The interference patterns may be compared to determine any changes to the target surface, such as anomalies, flaws, hazards, or the like, that may be present within the target surface 46. The preparing of interference patterns and comparisons thereof is indicated as reference 114 in FIG. 4.

According to one aspect, once the comparison has been made, the results may be displayed or otherwise communicated to the pilot, driver, or to another occupant within platform 44, or to a remote operator thereof in the case of unmanned operations (the recipient of the comparison may be collectively referred to as "an operator"). An operator may then take appropriate action based on the results of the comparison. By way of one non-limiting example, if the target surface is a bridge, and the comparison indicates a structural failure point, the operator may decide not to cross the bridge and may instead block or otherwise close off the bridge for repairs. By way of another example, if the interference pattern comparison indicates a more immediate hazard to the platform 44, evasive or defensive maneuvers may be performed.

According to another aspect, the comparison may be displayed or communicated to an operator only if a change in the condition of the target surface 46 is detected. When a change is not present, the processor 32 may store the comparison for later review, or may alternatively discard the comparison.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An optical transmitter for shearography comprising:
a first beam generator wherein the first beam generator is a laser beam generator that generates a first laser beam along a first beam path through the optical transmitter;
a second beam generator wherein the second beam generator is a laser beam generator that generates a second laser beam along a second beam path, different than and not overlapping with the first beam path, through the optical transmitter; and
a diverger lens within both of the first and second beam paths, wherein the first beam and the second beam travel through an identical point on the diverger lens and the diverger lens produces a beam spread illumination pattern;
a receiver configured to detect reflections of the beam spread illumination pattern generated by the first and second beams after traveling through the diverger lens; and
a processor configured identify non-uniform movement of a reflecting surface by comparing, overlaying, or comparing and overlaying reflection data from the receiver.

2. The optical transmitter of claim 1 wherein the diverger lens is spherical and is positioned at an intersection of the first and second beam paths.

3. The optical transmitter of claim 2 further comprising:
a first shaping optic within the first beam path; and
a second shaping optic within the second beam path.

4. The optical transmitter of claim 3 wherein the first shaping optic further comprises:
a first lens pair within the first beam path between the first beam generator and the diverger lens, wherein the first lens pair is operable to independently determine the X and Y divergence of the first beam.

5. The optical transmitter of claim 3 wherein the second shaping optic further comprises:
a second lens pair within the second beam path between the second beam generator and the diverger lens, wherein the second lens pair is operable to independently determine the X and Y divergence of the second beam.

6. The optical transmitter of claim 2 wherein each of the first beam path and the second beam path are oriented at an angle relative to the other of the first beam path and the second beam path.

7. The optical transmitter of claim 1 wherein the optical transmitter is carried by a moving platform, wherein the beam spread from the diverger lens appears to originate from a substantially same spatial point despite having been generated from two separate locations due to the moving platform.

8. The optical transmitter of claim 7 wherein the moving platform further comprises:
one of a rotary-winged aircraft, fixed wing aircraft, drone, and lighter than air aircraft.

9. The optical transmitter of claim 1 wherein the first beam generator and second beam generator are the same beam generator that is operable to generate a single beam and further comprises:
a plurality of optical components operable to direct the single beam down a first beam path and a second beam path separate from the first beam path.

10. The optical transmitter of claim 9 wherein the plurality of optical components further comprise:
at least one high speed switching optic to change the direction of the single beam from the first path to the second path.

11. The optical transmitter of claim 9 wherein the plurality of optical components further comprise:
a beam splitter operable to split the single beam into the first path and the second path.

12. A method of performing shearography comprising:
generating a first laser beam along a first beam path from a first beam generator carried by a platform;
directing the first laser beam through a diverger lens towards a target surface;
moving the platform from a first position to a second position;
generating a second laser beam along a second beam path, different than and not overlapping with the first beam path, from a second beam generator carried by the platform; and
directing the second laser beam through an identical point as the first laser beam on the diverger lens towards the target surface for a shearography measurement, wherein the diverger lens produces a beam spread from the first laser beam and the second laser beam that appears to originate from a substantially same spatial point despite having been generated from two separate locations.

13. The method of claim 12 further comprising:
applying a stressor to the target surface after directing the first laser beam through the diverger and prior to generating the second laser beam.

14. The method of claim 13 wherein applying the stressor to the target surface further comprises:
applying one of a mechanical stressor and an acoustic stressor to the target surface.

15. The method of claim 13 further comprising:
receiving each of the first and second laser beams as they reflect off of the target surface.

16. The method of claim 15 wherein receiving each of the first and second laser beams further comprises:
receiving the first laser beam reflection prior to applying the stressor; and
receiving the second laser beam reflection after applying the stressor.

17. The method of claim 16 further comprising:
creating a first interference pattern from the received first laser beam reflection and second interference pattern from the received second laser beam reflection via a processor.

18. The method of claim 17 further comprising:
comparing the first interference pattern to the second interference pattern to determine if a change to the target surface has occurred.

19. The method of claim 18 further comprising:
communicating a result of the comparison between the first and second interference patterns to an operator of the platform.

20. The method of claim 19 wherein communicating the result of the comparison further comprises:
communicating the result of the comparison between the first and second interference patterns to an operator of the platform only if a change is detected in the target surface.

* * * * *